United States Patent
Vervier et al.

(10) Patent No.: US 9,654,504 B1
(45) Date of Patent: May 16, 2017

(54) DETECTING A HIJACKED NETWORK ADDRESS

(71) Applicant: Symantec Corporation, Mountain View, CA (US)

(72) Inventors: Pierre-Antoine Vervier, Biot (FR); Marc Dacier, Santa Monica, CA (US); Olivier Thonnard, Grasse (FR)

(73) Assignee: Symantec Corporation, Mountain View, CA (US)

( * ) Notice: Subject to any disclaimer, the term of this patent is extended or adjusted under 35 U.S.C. 154(b) by 93 days.

(21) Appl. No.: 14/102,335

(22) Filed: Dec. 10, 2013

(51) Int. Cl.
*H04L 29/06* (2006.01)
*H04L 12/701* (2013.01)

(52) U.S. Cl.
CPC ...... *H04L 63/1483* (2013.01); *H04L 63/1408* (2013.01); *H04L 45/00* (2013.01)

(58) Field of Classification Search
CPC . H04L 63/1483; H04L 63/14; H04L 63/1408; H04L 63/1416; H04L 63/1425; H04L 63/1441; H04L 45/00
See application file for complete search history.

(56) References Cited

U.S. PATENT DOCUMENTS

| | | | |
|---|---|---|---|
| 7,823,202 B1* | 10/2010 | Nucci et al. | 726/22 |
| 7,926,104 B1* | 4/2011 | Sundaram | H04L 63/108 709/245 |
| 8,499,348 B1* | 7/2013 | Rubin | 726/22 |
| 8,578,468 B1* | 11/2013 | Yadav | 726/13 |
| 8,726,379 B1* | 5/2014 | Stiansen et al. | 726/22 |
| 2004/0103314 A1* | 5/2004 | Liston | H04L 63/1491 726/23 |
| 2005/0076139 A1* | 4/2005 | Jinmei | H04L 29/12066 709/245 |
| 2006/0288076 A1* | 12/2006 | Cowings et al. | 709/206 |
| 2010/0162396 A1* | 6/2010 | Liu et al. | 726/23 |

OTHER PUBLICATIONS

Feamster, Nick, Jaeyeon Jung, and Hari Balakrishnan. "An Empirical Study of "Bogon" Route Advertisements." ACM SIGCOMM Computer Communication Review 35.1 (2005): 63-70. Web.*

\* cited by examiner

*Primary Examiner* — Michael Pyzocha
*Assistant Examiner* — Alexander Lapian
(74) *Attorney, Agent, or Firm* — Wilmer Cutler Pickering Hale and Dorr LLP

(57) ABSTRACT

A computer system monitors a set of inactive addresses. The computer system identifies a suspicious activity associated with at least one inactive address of the set of inactive addresses. The computer system determines a suspicion score for the at least one inactive address based on the suspicious activity associated with the at least one inactive address. The computer system categorizes the at least one inactive address as a potentially hijacked address if the suspicion score exceeds a threshold.

12 Claims, 5 Drawing Sheets

DETECTING A HIJACKED NETWORK ADDRESS

FIELD

Embodiments of the invention relate to computer systems, and in particular to detecting suspicious activity on a network.

BACKGROUND

Internet architecture is comprised of multiple, interconnected networks. These interconnected networks use a routing infrastructure to communicate amongst each other. The routing infrastructure can include routers at various points within the internet architecture and can use a communication protocol, such as the Border Gateway Protocol (BGP), to exchange information about how to reach networks within the internet architecture. A router, for example, can identify an update within the architecture, such as a new network or a change associated with an existing network, and can inform other routers about this update. The routers can maintain a routing table to keep track of networks, route paths and address that are within the internet architecture.

SUMMARY

A system for detecting suspicious activity on a network is described. In one aspect, a method includes monitoring a set of inactive internet protocol (IP) addresses. The method further includes identifying a suspicious activity associated with at least one inactive IP address of the set of inactive IP addresses. The method further includes determining, by a processor, a suspicion score for the at least one inactive IP address based on the suspicious activity associated with the at least one inactive IP address. The method further includes categorizing the at least one inactive IP address as a potentially hijacked IP address if the suspicion score exceeds a threshold.

Implementations can include any, all, or none of the following features. The method can include identifying the set of inactive IP addresses based on historical routing data or registration data. Each inactive IP address of the set of inactive IP addresses can be associated with a common owner or can have a reserved, unallocated or unassigned status. Determining the suspicion score associated with at least one inactive IP address of the set of inactive IP addresses can include determining an initial suspicion score for the at least one IP address upon identifying the suspicious activity associated with the at least one IP address. The method can further include monitoring the at least one IP address for additional activity. The additional activity can be a second suspicious activity or a malicious activity. The method can further include when the additional activity can be detected, updating the suspicion score for the at least one IP address. The suspicious activity can include at least one of: the at least one inactive IP address being active, a new routing data origin, a new upstream provider, a reserved or unallocated or unassigned or previously inactive routing data origin, a reserved or unallocated or unassigned or previously inactive upstream provider, a country of the routing data origin, a country of an upstream provider, an owner of the set of inactive IP addresses, an owner of the routing data origin, an owner of an upstream provider, a country of origin of the set of inactive IP addresses, a mismatch between an actual routing configuration and an expected routing configuration, or a previous suspicious activity. The malicious activity can include, for instance, one or more of: spamming, phishing, or scam website hosting. Updating the suspicion score for the at least one IP address can include upon detecting the additional activity, determining whether the additional activity can be the malicious activity or the second suspicious activity. The method can further include when the additional activity can be the malicious activity, updating the suspicion score using a first value. The method can further include when the additional activity can be the second suspicious activity, updating the suspicion score using a second value. The first value can be higher than the second value. The method can include continuing to monitor the set of inactive IP addresses for a predetermined amount of time, until a threshold suspicion score can be reached, or until receiving input to stop the monitoring. The method can include providing a list of IP addresses that can have been categorized as being potentially hijacked to a system administrator.

In one aspect, an apparatus includes a memory. The apparatus further includes a processing device coupled to the memory, the processing device to execute a network agent to monitor a set of inactive internet protocol (IP) addresses, identify a suspicious activity associated with at least one inactive IP address of the set of inactive IP addresses, determine a suspicion score for the at least one inactive IP address based on the suspicious activity associated with the at least one inactive IP address, and categorize the at least one inactive IP address as a potentially hijacked IP address if the suspicion score exceeds a threshold.

In one aspect, a non-transitory computer readable storage medium includes instructions that, when executed by a processor, cause the processor to perform operations includes monitoring a set of inactive internet protocol (IP) addresses. The operations further include identifying a suspicious activity associated with at least one inactive IP address of the set of inactive IP addresses. The operations further include determining, by a processor, a suspicion score for the at least one inactive IP address based on the suspicious activity associated with the at least one inactive IP address. The operations further include categorizing the at least one inactive IP address as a potentially hijacked IP address if the suspicion score exceeds a threshold.

BRIEF DESCRIPTION OF THE DRAWINGS

The present disclosure will be understood more fully from the detailed description given below and from the accompanying drawings of various embodiments of the present invention, which, however, should not be taken to limit the present disclosure to the specific implementations, but are for explanation and understanding only.

DETAILED DESCRIPTION

Figure 1:
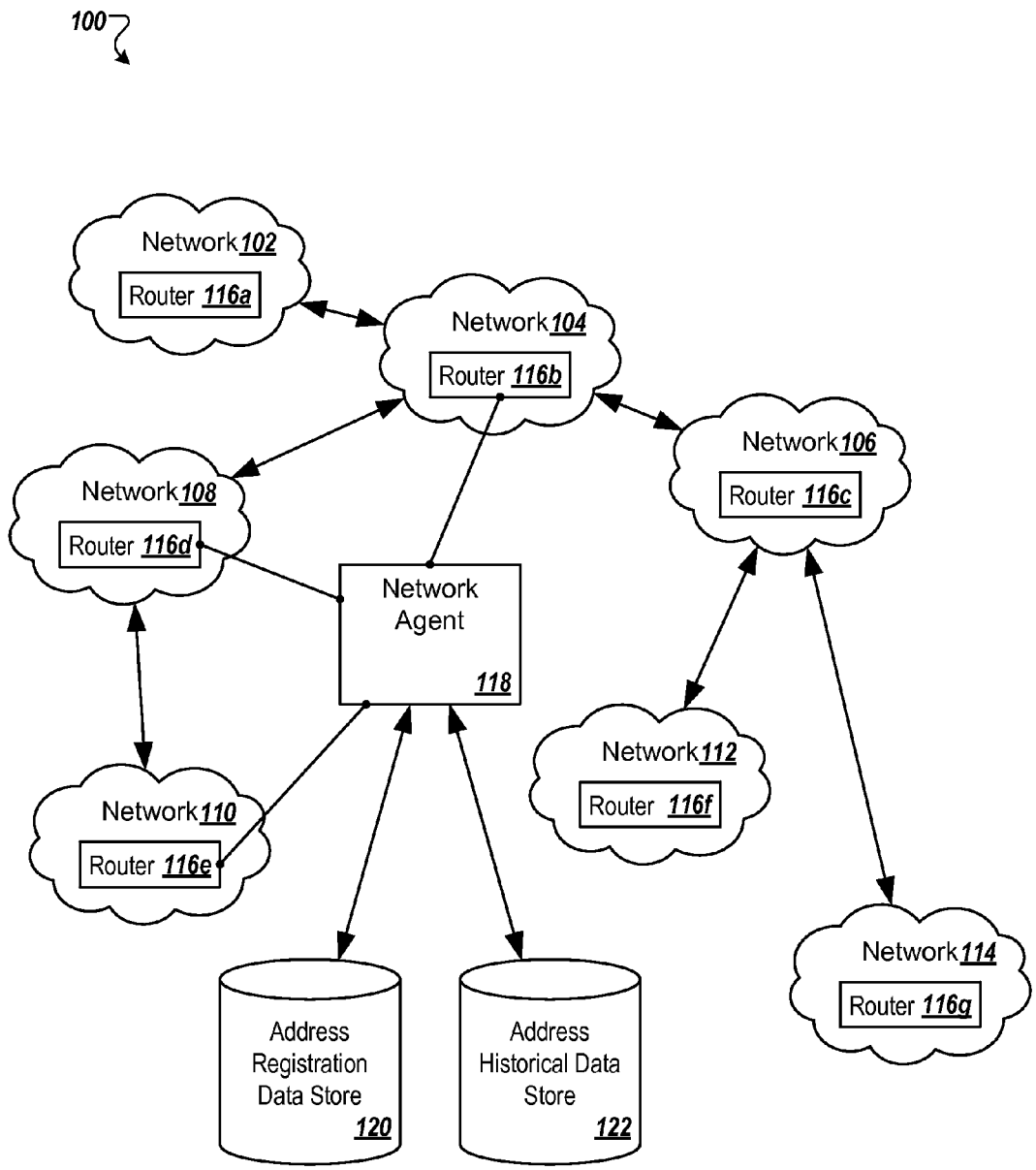
FIG. 1 is a block diagram of a sample network architecture, in which embodiments of the present invention may operate.

The internet is a collection of separate and distinct networks, each one operating under a common framework of globally unique addressing and a global routing protocol (e.g., BGP). When a new network first connects to the internet, the new network is assigned a set of addresses (e.g., internet protocol (IP) addresses) that inform existing networks how to access the new network. The new network can connect to a router that can advertise the set of addresses as well as route paths that are associated with the new network to other routers and networks. Using the advertised addresses and route paths, the other routers and networks can communicate with the new network.

An active IP address is an IP address that can be routed such that it appears in at least one routing table of a routing infrastructure. Such an active IP address can have any of the following status: allocated or unallocated, assigned or unassigned and reserved for a specific purpose. Although a set of addresses may be assigned to a network that is connected to the internet, the network or the set of addresses are not necessarily in use, e.g., the network or set of IP addresses may have been allocated or assigned but remain inactive. Some addresses are never used after being allocated or assigned. In other cases, an active address can fall into disuse and can become a dormant address, for example, after the organization owning it went bankrupt, stopped using it and did not return it to its address assignor or upstream provider. An IP address can also be reserved for a specific use and therefore is neither allocated nor assigned and should not be used for any other purpose than the expected one (e.g., private IP addresses). Addresses assigned to a network in either of these cases can be referred to as inactive addresses.

A third party can hijack an address by surreptitiously convincing an upstream provider that operates a router (e.g., internet service provider (ISP), etc.) into believing that the third party is the owner of a particular address. The third party can do so through hacking, social engineering, etc. Once the third party convinces the upstream provider that the third party is the owner of the particular address, the upstream provider can advertise that the address is associated with the third party. After receiving such an advertisement, routers can begin directing traffic associated with the address to and from the third party network. Alternatively, a third party can hijack an address by advertising to other routers that a network of the third party is associated with the address. Once a third party hijacks an address, the third party can use the address to communicate with others on the internet. For example, hijackers can send spam email messages, phishing attacks, or can run scam websites using the hijacked address.

When a network is unused or dormant, its addresses can become an attractive target for hijackers for various reasons. Hijackers can specifically target addresses owned by trusted corporations because these addresses can have a higher level of trust when compared to an address that has been newly assigned to an unknown owner.

Addresses owned by reputable owners, such as large corporations, can be included in a whitelist. When an address is on a whitelist it is thought to be trusted and large amounts of traffic associated with the address, for example, is not scrutinized as closely. Communications that originate from a whitelisted address are more likely to reach a recipient as compared to communications that originate from non-whitelisted addresses. Similarly, addresses associated with malicious or potentially malicious activity can be blocked using a blacklist. When an address is on a blacklist, communications to and from the blacklisted address can be limited or blocked.

By hijacking a whitelisted address, a third party can take advantage of the benefits of the whitelist (e.g., higher delivery rates, decreased scrutiny, etc.). When a third party hijacks an address on a whitelist, the third party can send a large amount of illicit communications (e.g., spam, scam, phishing, etc.) before being detected because the address is not being closely monitored for malicious activity. Similarly, hijacking an address on a whitelist often does not raise suspicion by others because activity associated with the address is thought to be authorized by a reputable owner. Further, it is not easy for an owner to detect when an inactive address is hijacked. For example, the owner cannot detect the hijack due to loss of traffic because the owner is not using the address.

Some contemporary approaches to detecting hijackers observe anomalies with changes in internet routing infrastructure but these approaches do not correlate the anomalies with malicious activity. These approaches do not determine whether an allegedly hijacked address might be used to launch a malicious attack over the internet. Other contemporary approaches include identifying IP addresses that are controlled entirely by hijackers and criminals and then distributing a blacklist or a "Do Not Route or Peer" list that flags these IP addresses.

Aspects of the present disclosure address these and other shortcomings that have not been solved by contemporary systems by detecting potentially hijacked addresses that are assigned to a legitimate entity. A network agent can identify and monitor a set of inactive addresses. The network agent can identify a suspicious activity associated with at least one inactive address of the set of inactive addresses. Then, the network agent can determine a suspicion score for the at least one inactive address based on the suspicious activity associated with the at least one inactive address. The network agent can categorize the at least one inactive address as a potentially hijacked address if the suspicion score exceeds a threshold. The suspicion score can indicate a likelihood that the address may be used to launch a malicious attack over the internet.

The terms "address" or "set of addresses" are used herein to include a single address, a group of addresses, a block of addresses (e.g., a prefix), etc. A 'set', as used herein, refers to any positive whole number of items. An address can be an IP address of any type, such as 32 bits (IPv4), 128 bits (IPv6), etc. A prefix refers to a beginning and ending of range of a group of addresses. For example, a prefix can identify a block of eight IP addresses, which can be represented by: 1.1.1.0/29. In this example, the first IP address in the block is 1.1.1.0 and the last IP address is 1.1.1.7. The set of inactive IP addresses can be dynamically and continuously updated. In some implementations, the set of inactive IP addresses can include IP addresses that once were inactive and have become active at a later time.

Turning now to the drawings, FIG. 1 is a block diagram of sample network architecture 100, in which implementations described herein may operate. The network architecture 100 may include multiple networks 102, 104, 106, 108, 110, 112, 114, routers 116*a-g*, and a network agent 118 capable of observing and monitoring communications between the multiple networks 102, 104, 106, 108, 110, 112, 114. A network 102, 104, 106, 108, 110, 112, 114 may include, for example, a private network such as a local area network (LAN), a wide area network (WAN), a global area network (GAN), or a combination of such networks, and may include a wired or wireless network. Each network 102, 104, 106, 108, 110, 112, 114 can also be an autonomous system (AS), which can be a collection of addresses that are under the control of one or more network operators that presents a common, clearly defined routing policy to other networks within the network architecture 100.

Each network 102, 104, 106, 108, 110, 112, 114 may include one or more routers 116a-g. The routers 116a-g can advertise or exchange network routing information and route paths to different networks, such as via a protocol (e.g., BGP). A route path describes how one network can connect to another network. The routers 116a-g can advertise a direct connection path between two networks or can advertise a multi-hop path that connects two networks through one or more other networks. When one router 116 obtains a path from another, for example, the router 116 can prepend or append its route information to the path and then advertise the path other routers 116. When that router advertises the path to other routers 116, the other routers 116 can prepend or append their information to the path. In this manner, a path between routers can be generated. For example, router 116a can advertise that a path to a particular address is via network 102. Router 116b can receive this advertisement and add network 104 to the path. Router 116b can then advertise an updated path and routers 116c and 116d can receive the advertisement from router 116b. Using the updated path, routers 116c or 116d know to go through network 104 to access the particular address of network 102. In other implementations, routers can advertise or broadcast routing tables that include network addresses and paths. A routing table can include multiple paths to any given network. In some implementations, the routing table identifies that best or optimal path to a particular address.

The network agent 118 can be a device that connects to one or more routers 116a-g and can receive advertisements or other communications transmitted by the one or more routers 116a-g. The network agent 118 can also be a software component that is part of a router 116a-g. Using information obtained from routers 116a-g and from other data sources described herein, the network agent 118 can identify inactive or dormant addresses and monitor those inactive addresses for suspicious activity. The network agent 118 can also receive any kind of suspicious or malicious IP-related traffic, for example, spam email logs, scam website data, etc. Once the network agent 118 identifies suspicious activity associated with the inactive address, the network agent 118 can determine a suspicion score that is based on the suspicious activity. The network agent 118 can also identify malicious activity associated with the address and can use the malicious activity to determine a new or updated suspicion score for the address. When the suspicion score associated with an address exceeds a threshold value, the network agent 118 can categorize the address as being potentially hijacked. An owner of the address or any other third party can be notified of the potentially hijacked address after which the owner or the other third party can take preventative or remedial action. The network agent 118 is described in further detail in conjunction with FIG. 2. For clarity, the network agent 118 is illustrated as being connected to networks 104, 108 and 110. The network agent 118, however, can be in communication with any number of networks.

The network agent 118 can be in communication with an address registration data store 120. The address registration data store 120 can include registration information for one or more addresses. Registration information can come from an address owner or assignee, from an upstream provider (e.g., an ISP) or from a registrar. When an entity becomes an owner or assignee of an address, for example, the entity provides registration information to an authorized address assignor or upstream provider (not shown), which can store the registration information in the address registration data store 120. One example of an address registration data store 120 is a WHOIS database. The registration information can include an owner's name, organization name, address, phone number, fax number, email address, nserver, contact person, a country of origin, a domain associated with the address, a date the domain was created, a date the domain was modified, a date the domain will expire, an identity of the authorized address assignor or upstream provider, a status of the address (e.g., reserved, unallocated, unused/inactive), etc. The network agent 118 can use the address registration information in the data store 120 to identify an inactive address, identify suspicious activity associated with the inactive address, and determine a suspicion score, as described in further detail in conjunction with FIG. 2.

The network agent 118 can be in communication with an address historical data store 122. The address historical data store 122 can include historical information that describes previous activities associated with the address. For example, the historical information can include information that an address has previously been used for a particular purpose, such as for email delivery, web hosting, etc. The historical information can also include information associated with the owner or assignee of the address. For example, historical information can indicate if the owner has gone out of business, acquired, merged, not in operation, bankrupt, etc. The historical information can also include information describing a particular configuration for the address (e.g., a particular route path, network or node topology), a method of accessing a network associated with the address, etc. The network agent 118 can use historical address information in the data store 122 to identify an inactive address, identify suspicious activity associated with the inactive address, and determine a suspicion score, as described in further detail in conjunction with FIG. 2. The address historical data store 122 can be a collection of historic records from the route table data store 206, the address registration data store 120 and information on what IP addresses are used for, such as network traffic (e.g., legitimate email messages, spam, web site hosting, etc.). The network agent 118 can be in communication with a route table data store 206. The route table data store 206 can include information about route paths. Route paths information can include, for example, information from route advertisements received by the network agent 200, information from route advertisements received by other routers in the internet. The network agent 118 can use the address registration information in the data store 120 to identify an inactive address, identify suspicious activity associated with the inactive address, and determine a suspicion score.

IP address registration data store 120, IP address historical data store 122 and route table data store 206 can reside at the same geographical location and can be on the same system or device. In other implementations, the IP address registration data store 120 and the IP address historical data store 122 reside in separate geographical locations that are accessible to the network agent 118.

Figure 2:
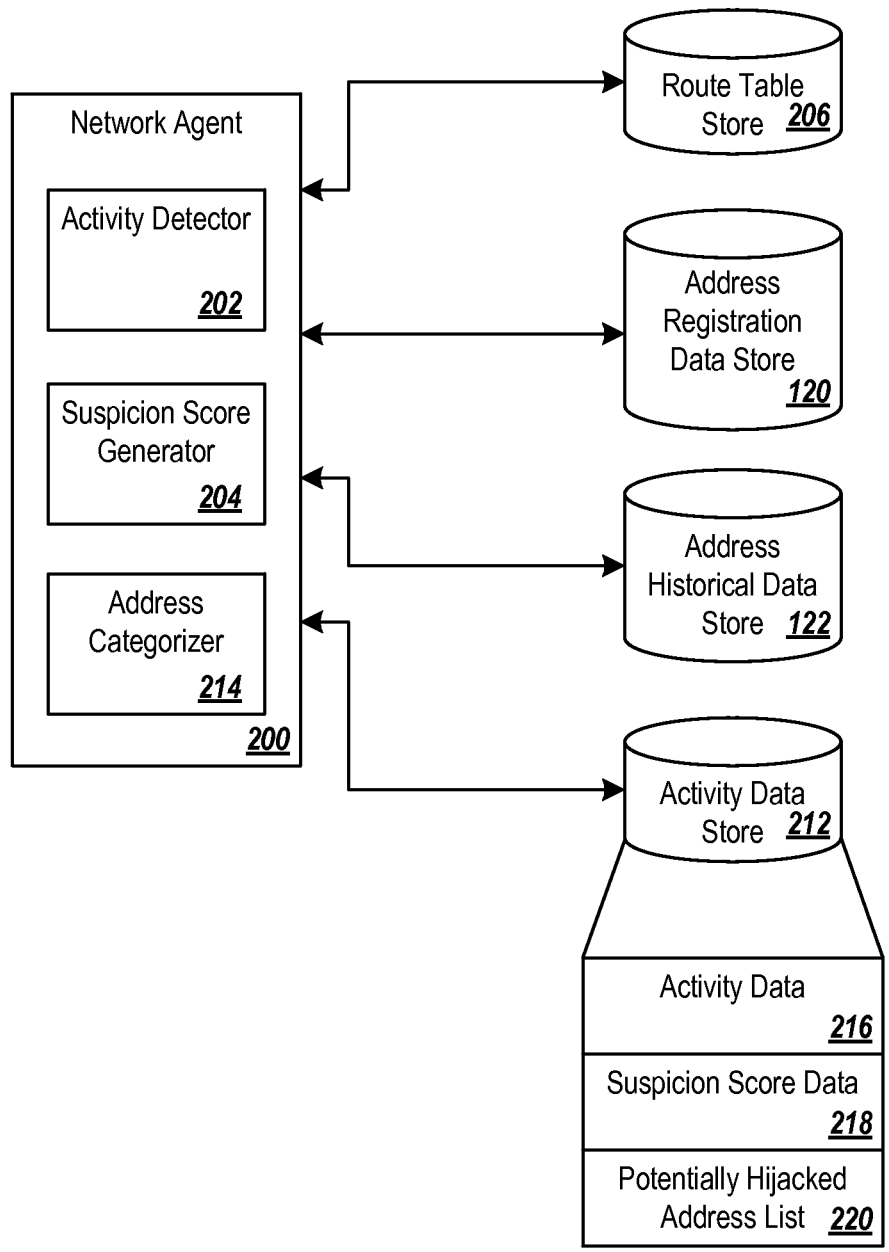
FIG. 2 is a block diagram illustrating a network agent, according to implementations.

FIG. 2 is a block diagram of one embodiment of a network agent 200. The network agent 200 can be the same or similar as network agent 118 of FIG. 1. The network agent 200 can include an activity detector 202, a suspicion score generator 204, and an IP address categorizer 214. The network agent 200 may include more or fewer components. The network agent 200 may be connected to one or more data stores, such as a route table store 206, IP address registration data store 120, IP address historical data store 122 and activity data store 212. The data stores may be file systems, databases or other data management layers resident on a data storage device such as a disk drive, RAM, ROM, database, etc. The data stores 206, 120, 122 and 212 can be a persistent storage that are capable of storing data. A persistent storage unit can be a local storage unit or a remote storage unit. Persistent storage units can be a magnetic storage unit, optical storage unit, solid state storage unit, electronic storage unit (main memory), or similar storage unit. Persistent storage units can be a monolithic device or a distributed set of devices. Any of the data stores described herein can be internal to the network agent 200 or external to the network agent 200 and accessible by the network agent 200 via a network. As will be appreciated by those skilled in the art, in some implementations a data store may be a network-attached file server or a cloud-based file server, while in other implementations data store might be some other type of persistent storage such as an object-oriented database, a relational database, and so forth.

The activity detector 202 can identify inactive addresses. In implementations, the activity detector 202 can monitor communications between routers to identify inactive (e.g., dormant) addresses. To identify inactive addresses, the activity detector 202 can receive route advertisement messages that originate from any of routers 116a-g of FIG. 1 or can use route paths information from a route table store 206 over a period of time. If an address that once appeared as part of the advertisement message has not been part of a route path for a predetermined period of time, then the activity detector 202 can determine that the address is inactive. In other implementations, the activity detector 202 can use the registration information to identify inactive addresses. The activity detector 202 can obtain registration information for a set of addresses from the IP address registration data store 120. For example, the activity detector 202 can obtain information that a particular address has been assigned to an entity, such as an internet service provider (ISP), to an entity, or to an end user. To identify inactive addresses, the activity detector 202 can compare addresses included in route advertisements with the registration information stored in IP address registration data store 120. The activity detector 202 can identify an address as being dormant when the address has a registered owner in the IP address registration data store 120 but the address is not associated with a route path in a route advertisement or in a routing table. The activity detector 202 can also receive historical data about the address from the IP address historical data store 122 to determine if the address is inactive. For example, when Company A is listed as the registered owner of an address and when the historical data indicates that Company A is no longer in operation, the activity detector 202 can determine that the address is inactive. In implementations, the activity detector 202 can receive a list of addresses that have already been characterized as being inactive, such as by a system administrator. In other implementations, an address owner provides a set of addresses to the activity detector 202 and the activity detector 202 monitors that set of addresses.

Once the activity detector 202 identifies an inactive address, the activity detector 202 can monitor the inactive address for activity. When the activity detector 202 identifies an activity (e.g., address registration information or historical information changes) associated with an inactive address, the activity detector 202 can determine if the activity is suspicious. All data collected by the activity detector 202 can be stored as activity data 216 in activity data store 212. To identify activity associated with the address, the activity detector 202 can monitor router communications, address registration data store 120 and historical data store 122.

The activity detector 202 can obtain or intercept communications (e.g., advertisement messages) from or between routers or can use route paths information form the route table data store 206. The activity detector 202 can identify changes in route paths or route destinations associated with an inactive address and can determine whether any of these changes are suspicious. For example, suspicious activity can be a new route path through a suspicious network.

The activity detector 202 can also monitor or query the address registration data store 120 for changes to registration information associated with an address. For example, through monitoring the registration information, the activity detector 202 can identify a change in an owner or assignee of an address. Any change may be suspicious. For example, a change to an address that is highly unlikely to change hands, such as an address assigned to a government, can be a suspicious activity. In another example, a change in an owner of an address is not suspicious by itself, but the identity of the new owner can be suspicious.

To identify activity associated with an inactive address, the activity detector 202 also can compare historical information of the historical data store 122 with the current router communications or route paths information from the route table data store. Any differences between the historical information and the current router communications can be stored as activity data 216. In some implementations, when the activity detector 202 identifies a difference between the router communications and the historical information, the activity detector 202 can determine whether the difference is suspicious. For example, an address that has historically been used for email services that is now being used to host a website can be a suspicious activity. In another example, a change in topology can be suspicious when it includes a network or path that historically has been associated with suspicious or malicious activity.

Further examples of suspicious activities that the activity detector 202 can identify can include: a new network that is using or advertising the address (e.g., a new BGP origin network for the address), a new upstream provider for the address (e.g., a new ISP or transit network), a reserved, unallocated or previously inactive origin network or upstream provider for the address (e.g., an address that should not appear in a router communication), a suspicious origin network or upstream provider with respect to the owner of the address or the country of origin of the address, a new network owner, a new address owner, a new network or address owner that is associated with suspicious or malicious activity, a suspicious origin network or upstream provider, a mismatch between the actual routing configuration and a routing configuration defined in the registration information (e.g., a violation of a routing policy), an address, network or upstream provider that has been involved in previous suspicious or malicious activity and hijacks, a new route path associated with the address, a change in topology associated with the address, a new way to access or reach the address. The activity detector 202 can also identify malicious activity associated with the address, such as spamming, scam websites, phishing, etc. Upon detection of any activity, the activity detector can store the identified activity as activity data 216.

The suspicion score generator 204 uses the activity data 216 of activity data store 212 that was obtained by the activity detector 202 to determine a suspicion score for the address. The suspicion score generator 204 can implement an algorithm that uses the activity data 216 obtained by the activity detector 202 to output a suspicion score. The activity detector 202 can take any of the activity data 216 into account when determining the suspicion score. The algorithm can include factors or weights for different types of activities. Certain activities can affect the suspicion score differently than other activities. For example, a change in owner of an address may not affect the suspicion score as much as a new routing configuration that violates a defined routing policy. Combinations of activities can also affect the suspicion score in different ways. For example, a change in owner may have little effect on the suspicion score when the new owner is a large, reputable corporation. A new owner that has previously engaged in suspicious or malicious activity, however, can have more of an affect than a new owner with no known history of suspicious or malicious activity. Malicious activity (e.g., spam, scam, phishing) can affect the suspicion score more than suspicious activity. The suspicion score generator 204 uses this information to determine a suspicion score and can store the suspicion score as suspicion score data 218 in activity data store 212.

The address categorizer 214 uses the suspicion score, which was determined by the suspicion score generator 204, to categorize the address. The address categorizer 214 can determine that a particular address is potentially hijacked based on the suspicion score. For example, if a suspicion score exceeds a threshold, the address categorizer 214 can determine that the particular address is potentially hijacked. The address categorizer 214 can create a list of potentially hijacked addresses and can associate a suspicion score with each address in the list. The list of potentially hijacked addresses can be stored as a potentially hijacked address list 220 in activity data store 212 and can be presented to a system administrator as an email, as a file, as raw data, as a webpage, via a graphical user interface, etc.

Once the address categorizer 214 determines that an address is potentially hijacked, the activity detector 202 can continue to monitor the address for additional activity. The additional activity can be an additional suspicious activity or a malicious activity. When the activity detector 202 identifies an additional activity it can add the detected activity to the activity data 216 in data store 212. The suspicion score generator 204 can use this new data to update the suspicion score for the address, to update the suspicion score data 218 and to update the potentially hijacked address list 220.

Figure 3:
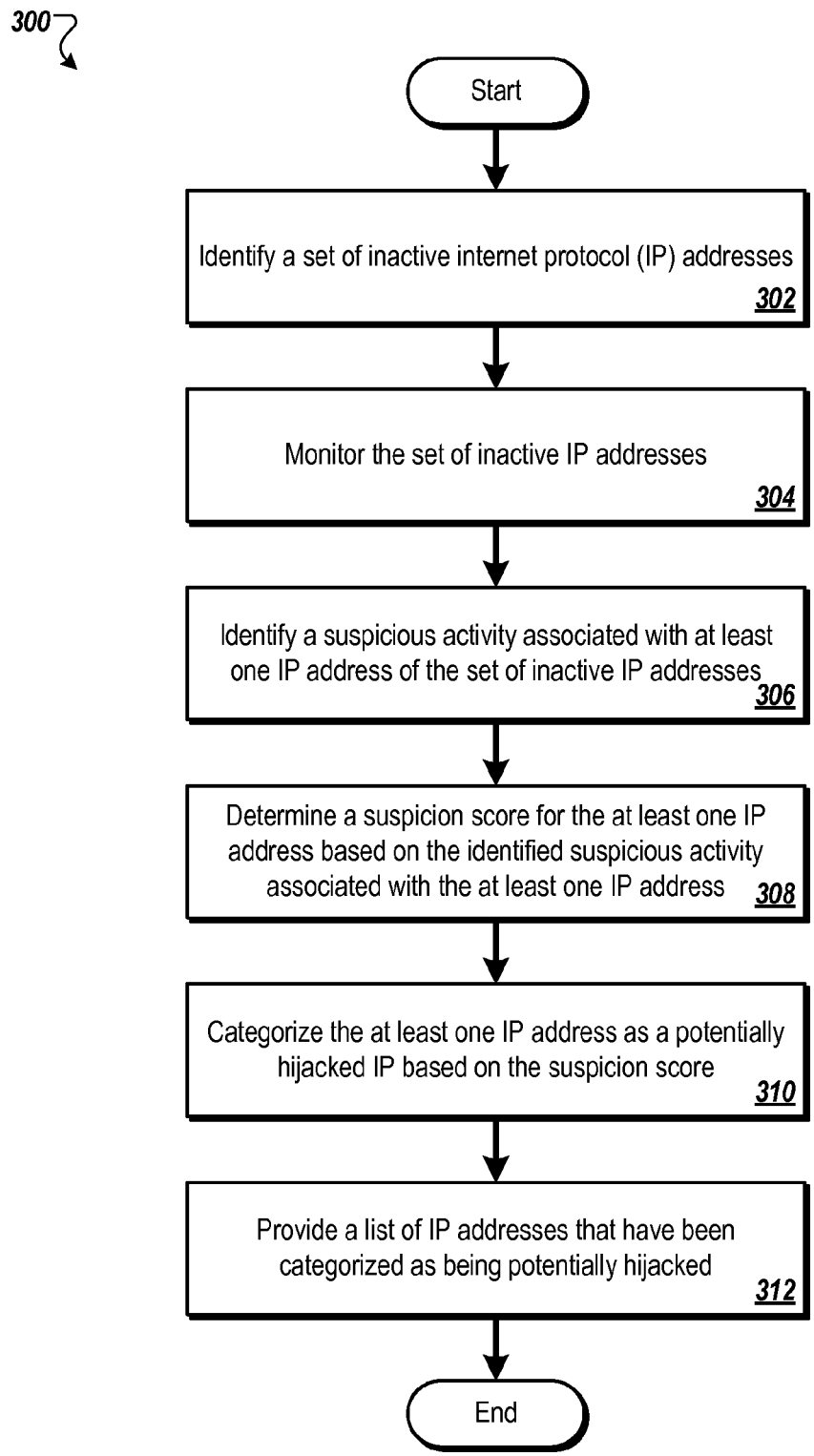
FIG. 3 is a flow diagram illustrating a method for categorizing a potentially hijacked IP address, according to implementations.

FIG. 3 is a flow diagram illustrating a method for categorizing a potentially hijacked IP address, according to implementations. The method 300 may be performed by processing logic that comprises hardware (e.g., circuitry, dedicated logic, programmable logic, microcode, etc.), software (e.g., instructions run on a processor to perform hardware simulation), or a combination thereof. In one implementation, method 300 may be performed by a network agent (e.g., network agent 118 of FIG. 1).

Referring to FIG. 3, at block 302, processing logic identifies a set of inactive IP addresses. Processing logic can determine that the set of inactive IP addresses is inactive by using address registration data, route table data, historical data, or by receiving a list of inactive IP addresses, or a combination thereof, as described in further detail in conjunction with FIG. 2.

At block 304, processing logic monitors the set of inactive IP addresses for activity. Processing logic can detect suspicious or malicious activity associated with the set of inactive IP addresses. Suspicious activity can include at least one of: the at least one inactive IP address being active (when an IP address is hijacked it becomes active at least for the duration of the hijack, i.e., it appears in a routing table), a new routing data origin, a new upstream provider, a reserved or unallocated or unassigned or previously inactive routing data origin, a reserved or unallocated or unassigned or previously inactive upstream provider, a country of the routing data origin, a country of an upstream provider, an owner of the set of inactive IP addresses, an owner of the routing data origin, an owner of an upstream provider, a country of origin of the set of inactive IP addresses, a mismatch between an actual routing configuration and an expected routing configuration, or a previous suspicious activity. Malicious activity can include, for instance, one or more of spamming, phishing, or scam website hosting. At block 306, processing logic identifies a suspicious activity associated with at least one inactive IP address of the set of inactive IP addresses.

Figure 4:
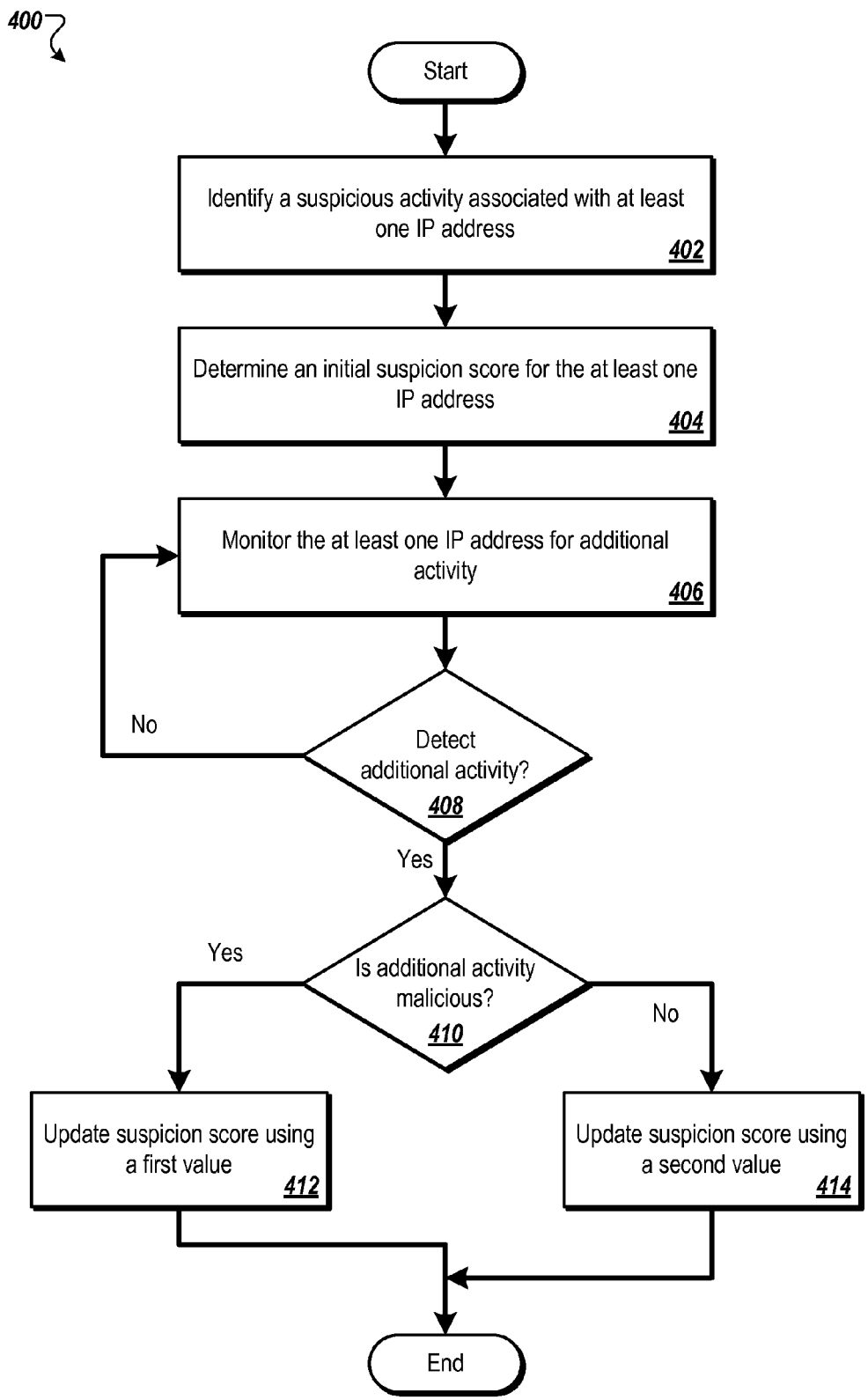
FIG. 4 is a flow diagram illustrating a method for detecting a potentially hijacked IP address, according to implementations.

At block 308, processing logic can determine a suspicion score for the at least one inactive IP address based on the suspicious activity associated with the at least one inactive IP address, as described in further detail in conjunction with FIG. 4.

At block 310, processing logic can categorize the at least one inactive IP address as a potentially hijacked IP address if the suspicion score exceeds a threshold. At block 312, processing logic can provide a list of IP addresses that have been categorized as being potentially hijacked.

FIG. 4 is a flow diagram illustrating a method for detecting a potentially hijacked IP address, according to implementations. The method 400 may be performed by processing logic that comprises hardware (e.g., circuitry, dedicated logic, programmable logic, microcode, etc.), software (e.g., instructions run on a processor to perform hardware simulation), or a combination thereof. In one implementation, method 400 may be performed by a network agent (e.g., network agent 118 of FIG. 1).

Referring to FIG. 4, at block 402, processing logic identifies a set of inactive IP addresses. Processing logic can determine that the set of inactive IP addresses are inactive by using communication between routers or route table information from a route table data store 206, address registration information, historical information, or by receiving a list of inactive IP addresses, or a combination thereof.

At block 404, processing logic can determine an initial suspicion score for the at least one IP address upon identifying a suspicious activity associated with the at least one IP address. At block 406, processing logic can monitor the at least one IP address for additional activity. The additional activity can be a second suspicious activity or a malicious activity. The second suspicious activity can be any type of suspicious activity including the same type of activity as the first suspicious activity. Processing logic can continue to monitor the at least one IP address for additional activity until it detects an additional activity at block 408.

When the additional activity is detected, processing logic can update the suspicion score for the at least one IP address. Upon detecting the additional activity, processing logic can determine whether the additional activity is the malicious activity or the second suspicious activity. When the additional activity is a malicious activity, processing logic can update the suspicion score using a first value at block 412. When the additional activity is not a malicious activity (e.g., the second suspicious activity), processing logic can update the suspicion score using a second value at block 414. In implementations, the first value is higher than the second value.

In implementations, processing logic can continue to monitor the set of inactive IP addresses. For example, processing logic can monitor the set of inactive IP addresses for a predetermined amount of time, until a threshold suspicion score is reached, or until receiving input to stop the monitoring.

Figure 5:
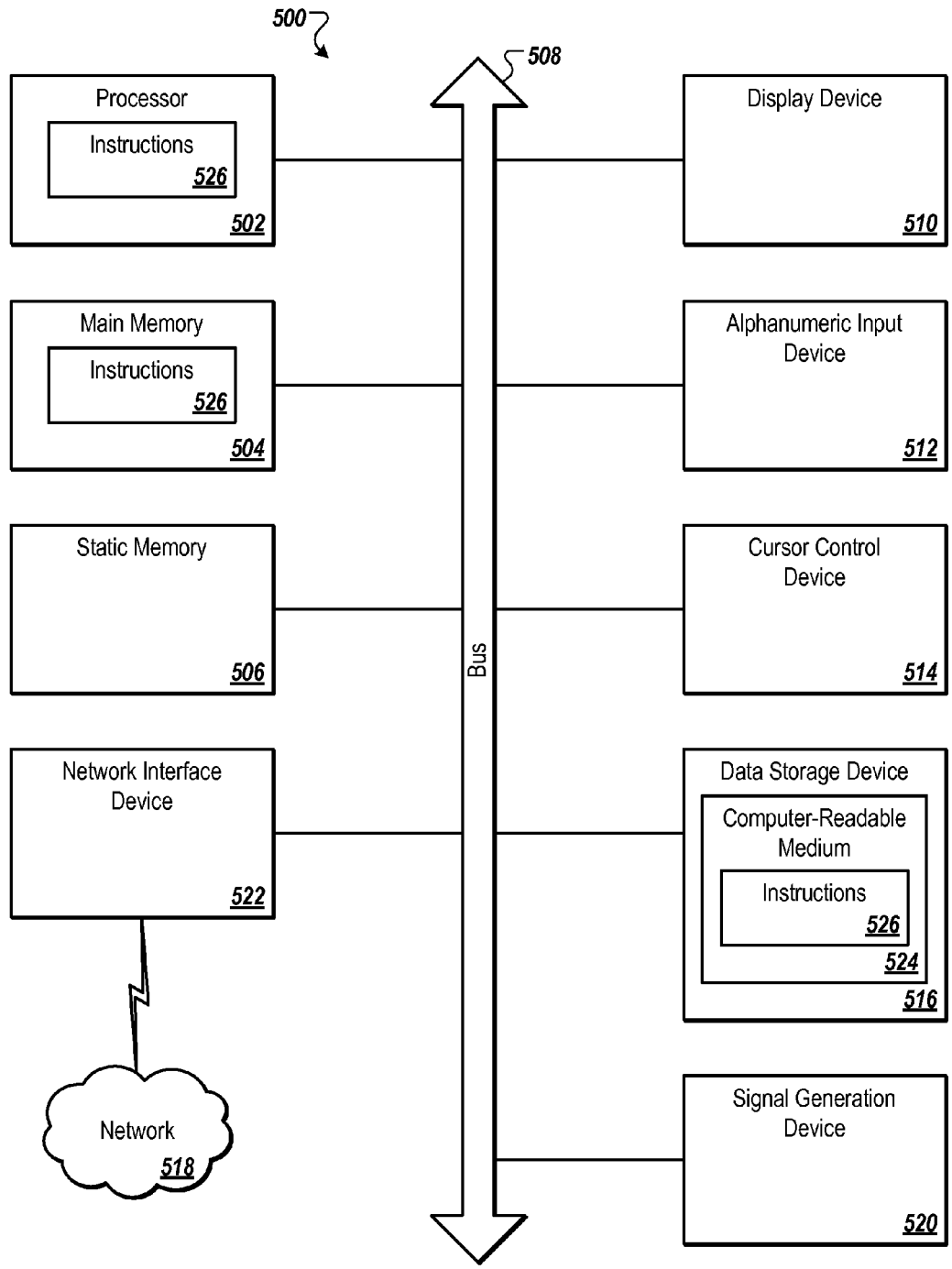
FIG. 5 is a block diagram illustrating one embodiment of a computer system, according to implementations.

FIG. 5 illustrates a diagrammatic representation of a machine in the example form of a computer system 500 within which a set of instructions, for causing the machine to perform any one or more of the methodologies discussed herein, may be executed. The system 500 may be in the form of a computer system, such as a server computer system, within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a mobile device, a tablet, a smartphone, a TV, a laptop computer, a netbook, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may represent network agent 118 in FIG. 1.

The example computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 may be configured to execute the network agent 118 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions of a network agent 118) embodying any one or more of the methodologies or functions described herein. The instructions 526 may also reside, completely or at least partially, within the main memory 504 and/or within processing logic of the processor 502 during execution thereof by the computer system 500, the main memory 504 and the processor 502 also constituting computer-readable media. The instructions may further be transmitted or received over a network 518 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The present description sets forth numerous specific details such as examples of specific systems, components, methods, and so forth, to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The computer readable storage medium can be non-transitory.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a set of inactive addresses, each inactive address of the set of inactive addresses having routing information comprising border gateway protocol information and registration information, wherein the set of inactive addresses is identified based on each inactive address of the set of inactive addresses appearing in a route advertisement message and subsequently not appearing in a route path for a predetermined period of time;
   monitoring border gateway protocol information and registration information for each inactive address of the set of inactive addresses;
   identifying a suspicious activity associated with at least one inactive address of the set of inactive addresses based on monitoring of corresponding gateway protocol information and registration information, wherein the suspicious activity comprises a mismatch between an actual routing configuration and an expected routing configuration defined in the registration information;
   upon identifying the suspicious activity associated with the at least one inactive address, determining an initial suspicion score for the at least one inactive address;
   monitoring the at least one inactive address for additional activity, wherein the additional activity is a second suspicious activity or a malicious activity;
   when the additional activity is detected, updating the suspicion score for the at least one inactive address based on the additional activity, wherein updating the suspicion score for the at least one inactive address comprises:
      upon detecting the additional activity, determining whether the additional activity is the malicious activity or the second suspicious activity;
      when the additional activity is the malicious activity, updating the suspicion score using a first value; and
      when the additional activity is the second suspicious activity, updating the suspicion score using a second value, wherein the first value is higher than the second value; and
   categorizing the at least one inactive address as a potentially hijacked address if the suspicion score exceeds a threshold.

2. The method of claim 1, wherein each inactive address of the set of inactive addresses is an internet protocol (IP) address that is associated with a common owner or has a status of reserved, unallocated or unassigned.

3. The method of claim 1, wherein the suspicious activity further comprises at least one of: the at least one inactive address being active, a new routing data origin, a new upstream provider, a reserved or unallocated or unassigned or previously inactive routing data origin, a reserved or unallocated or unassigned or previously inactive upstream provider, a country of the routing data origin, a country of an upstream provider, an owner of the set of inactive addresses, an owner of the routing data origin, an owner of an upstream provider, a country of origin of the set of inactive addresses, or a previous suspicious activity.

4. The method of claim 1, wherein the malicious activity comprises one or more of spamming, phishing, or scam web site hosting.

5. The method of claim 1 further comprising continuing to monitor the set of inactive addresses for a predetermined amount of time, until a threshold suspicion score is reached, or until receiving input to stop the monitoring.

6. The method of claim 1 further comprising providing a list of addresses that have been categorized as being potentially hijacked to a system administrator.

7. An apparatus comprising:
   a memory; and
   a processing device coupled to the memory, the processing device to execute a network agent to:
   identify a set of inactive addresses, each inactive address of the set of inactive addresses having routing information comprising border gateway protocol information and registration information, wherein the set of inactive addresses is identified based on each inactive address of the set of inactive addresses appearing in a route advertisement message and subsequently not appearing in a route path for a predetermined period of time;
   monitor border gateway protocol information and registration information for each inactive address of the set of inactive addresses
   identify a suspicious activity associated with at least one inactive address of the set of inactive addresses based on monitoring of corresponding gateway protocol information and registration information, wherein the suspicious activity comprises a mismatch between an actual routing configuration and an expected routing configuration defined in the registration information;

determine an initial suspicion score for the at least one inactive address upon identification of the suspicious activity associated with the at least one inactive address;

monitor the at least one inactive address for additional activity, wherein the additional activity is a second suspicious activity or a malicious activity;

when the additional activity is detected, update the suspicion score for the at least one inactive address based on the additional activity, wherein updating the suspicion score for the at least one inactive address comprises:

upon detecting the additional activity, determine whether the additional activity is the malicious activity or the second suspicious activity;

when the additional activity is the malicious activity, update the suspicion score using a first value; and when the additional activity is the second suspicious activity, update the suspicion score using a second value, wherein the first value is higher than the second value; and categorize the at least one inactive address as a potentially hijacked address if the suspicion score exceeds a threshold.

8. The apparatus of claim 7, wherein the network agent is to continue to monitor the set of inactive addresses for a predetermined amount of time, until a threshold suspicion score is reached, or until receiving input to stop the monitoring.

9. The apparatus of claim 7, wherein the network agent is to provide a list of addresses that have been categorized as being potentially hijacked to a system administrator.

10. A non-transitory computer readable storage medium including instructions that, when executed by a processor, cause the processor to perform operations comprising:

identifying a set of inactive internet protocol (IP) addresses, each inactive address of the set of inactive IP addresses having routing information comprising border gateway protocol information and registration information, wherein the set of inactive IP addresses is identified based on each inactive address of the set of inactive IP addresses appearing in a route advertisement message and subsequently not appearing in a route path for a predetermined period of time;

monitoring border gateway protocol information and registration information for each inactive address of the set of inactive IP addresses;

identifying a suspicious activity associated with at least one inactive IP address of the set of inactive IP addresses based on monitoring of corresponding gateway protocol information and registration information, wherein the suspicious activity comprises a mismatch between an actual routing configuration and an expected routing configuration defined in the registration information;

upon identifying the suspicious activity associated with the at least one inactive IP address, determining an initial suspicion score for the at least one inactive IP address;

monitoring the at least one inactive IP address for additional activity, wherein the additional activity is a second suspicious activity or a malicious activity;

when the additional activity is detected, updating the suspicion score for the at least one inactive IP address based on the additional activity, wherein updating the suspicion score for the at least one inactive address comprises:

upon detecting the additional activity, determining whether the additional activity is the malicious activity or the second suspicious activity; when the additional activity is the malicious activity, updating the suspicion score using a first value; and when the additional activity is the second suspicious activity, updating the suspicion score using a second value, wherein the first value is higher than the second value; and categorizing the at least one inactive IP address as a potentially hijacked IP address if the suspicion score exceeds a threshold.

11. The non-transitory computer readable storage medium of claim 10, wherein the processor is further to perform operations comprising continuing to monitor the set of inactive IP addresses for a predetermined amount of time, until a threshold suspicion score is reached, or until receiving input to stop the monitoring.

12. The non-transitory computer readable storage medium of claim 10, wherein the processor is further to perform an operation comprising providing a list of IP addresses that have been categorized as being potentially hijacked to a system administrator.

* * * * *